No. 734,907. PATENTED JULY 28, 1903.
C. W. LOVELL & D. WILLIAMSON.
BOOK TRIMMING MACHINE.
APPLICATION FILED DEC. 24, 1901.

NO MODEL. 7 SHEETS—SHEET 5.

Witnesses
Bert C. Jones.
Charles W. Hildreth

Inventors
Charles W. Lovell
David Williamson
By their Attorney
A. G. N. Vermilya No. 734,907. PATENTED JULY 28, 1903.
C. W. LOVELL & D. WILLIAMSON.
BOOK TRIMMING MACHINE.
APPLICATION FILED DEC. 24, 1901.
NO MODEL 7 SHEETS—SHEET 6.

No. 734,907. PATENTED JULY 28, 1903.
C. W. LOVELL & D. WILLIAMSON.
BOOK TRIMMING MACHINE.
APPLICATION FILED DEC. 24, 1901.
NO MODEL. 7 SHEETS—SHEET 7.

Witnesses
Ivan Konigsberg
H. M. Vromilya

Inventors
Charles W. Lovell
David Williamson
By their Attorney
H. S. N. Vermilya

THE NORRIS PETERS CO., PHOTO-LITHO., WASHINGTON, D. C.

No. 734,907.　　　　　　　　　　　　　　　　　　　Patented July 28, 1903.

UNITED STATES PATENT OFFICE.

CHARLES W. LOVELL AND DAVID WILLIAMSON, OF NEW YORK, N. Y.; SAID WILLIAMSON ASSIGNOR TO SAID LOVELL.

BOOK-TRIMMING MACHINE.

SPECIFICATION forming part of Letters Patent No. 734,907, dated July 28, 1903.

Application filed December 24, 1901. Serial No. 87,070. (No model.)

*To all whom it may concern:*

Be it known that we, CHARLES W. LOVELL and DAVID WILLIAMSON, citizens of the United States, and residents of New York city, State of New York, have invented certain new and useful Improvements in Book-Trimming Machines and Analogous Devices, of which the following is a specification, reference being had to the accompanying drawings, forming part of the same, in which—

Fig. 4 is an end elevation of the machine when certain parts are removed.
Fig. 8 is an enlarged elevation of the pin-carriage, the pins, and their operating-levers.
Fig. 9 is an elevation of a portion of the pin-carriage, showing the pin-actuating lever in a different position from that shown in Fig. 8.
Fig. 10 is a diagrammatic sketch showing the relative positions and arrangement of the frame, the plate-carriers Q, and the regulating-screw O and its gears.
Fig. 11 is a face view, partly in section, of the cutting-block B.
Fig. 12 is a detached elevation of a clamp, a knife-carrier, a knife-blade support, a knife, a rocking lever, and the links which connect the lever to the clamp and the knife-carrier.

The machine is intended to cut or trim the edges of books, magazines, pamphlets, and analogous articles.

The signatures, as is well known, often come from the press and folder with rough and irregular edges, and their trimming involves much labor, particularly if for books to be bound, as accuracy must be had, and at the same time speed and economy are also requisites of successful work. Early prospectors in this field have proceeded by clamping a stack of signatures sometimes a foot high to a turn-table and then cutting first one side, then the front, and then the other side, thus requiring three operations for the actual cutting; but it has been found that the size of the signatures or the sewed book at the top of such a stack will vary from that of those at the bottom, and the resultant book is imperfect—that is, the book at the top of the stack will differ in size from that at the bottom. We have, however, discovered that speed, economy, and also accuracy may be attained in trimming books by machinery, and the machine we now describe will accomplish those results.

F is the main frame of the machine, which may be of cast metal and for durability and to permit rapid work is made quite heavy. In general outline it is a large rectangular box. A table T preferably projects at the front both for convenience and also to act as a shield to the gear-wheel G' and as ways or supports extends the whole length of the machine, though openings therethrough are provided to accommodate the other parts. We prefer to construct the table beyond the shelf part in the form of a center rail as narrow as the shortest book intended to be cut and for longer books to provide interchangeable leaves of varying widths adapted to support the book to be cut and reaching from the sides of the center rail toward the sides of the machine such a distance as will sufficiently support such book as is being trimmed. These leaves may be held in place by bolts or threaded screws.

In the frame F we mount a driving-shaft D, provided with a gear G, and at the front we provide another (the main) shaft M, on which the gear-wheel G' (meshing with gear G) is mounted. The main shaft M is a crank-shaft and beside the crank C is provided with a cam C' at one side and a crank C² at the other. A rock-shaft R with a sleeve R' is placed transverse the frame and near its base. From sleeve R' two levers L extend upward and are linked to the feed-bars $f$, which are mounted in suitable ways $w$. Attached to the feed-bars $f$ are the pin-carriages $c$, the connection being shown as made by means of elbow-levers E E', pivoted at the elbow on the carrying-frame and at the end of the short arm to the feed-bars $f$, rollers being provided to lessen the friction. Connection between the crank $C^2$ and the sleeve R' is established by a pitman P and an arm $a$, the result being that at each turn of the shaft M the sleeve R' is rocked back and forth, oscillating levers L, and consequently reciprocating the feed-bars $f$ and the connected pin-carriages $c$. These pin-carriages are provided with sets of three pins $p\ p'\ p^2$, the first, $p$, being fixed, but the second and third, $p'\ p^2$, located in vertical grooves in the carriages, and when the feed-bars are advanced they first swing the elbow-levers E E' on their pivots until the short arms strike stops $s^2\ s^3$ on the carriages. The long arms of levers E E' register with and bear against the lower ends of pins $p'$ and $p^2$, and consequently the rocking of those levers E E' projects pins $p'\ p^2$ above the surface of the carriage. Further forward movement of the feed-arms $f$ must necessarily drive forward the feed-carriage to the limit of the feed, and when the movement of crank $C^2$ reverses the movement of sleeve R', lever L, and feed-bars $f$ the first action will swing the elbow-levers E E' and the pins $p'\ p^2$, deprived of support, will fall in their grooves till at or below the surface of the carriage $c$, which is very slightly below the surface of the table T. Then the short arms of E and E' strike stops $s\ s'$, and the further return movement of the feed-bars $f$ carries the pin-carriages back to their first position.

Figures 8, 9, 10, 11, 12:
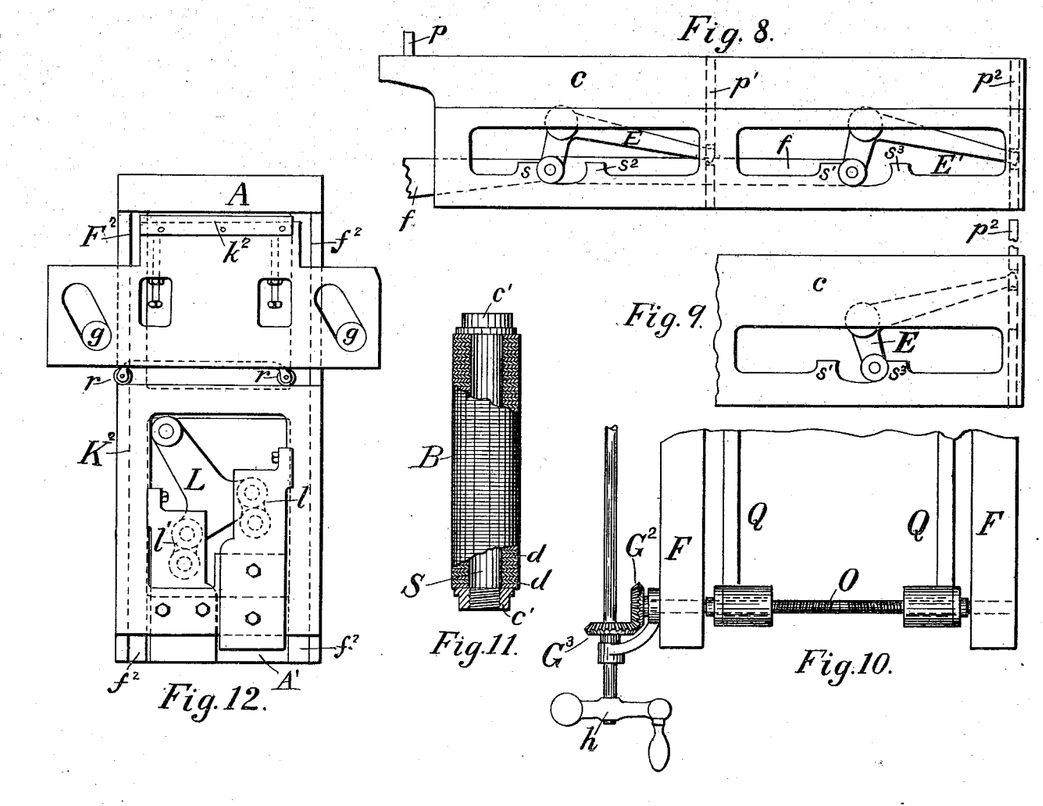
Figure 13:
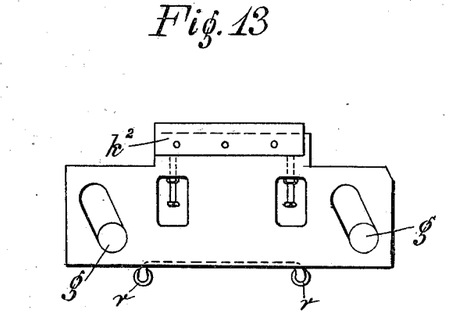
Fig. 13 is a detached view of the knife-blade support and the knife.
Figure 14:
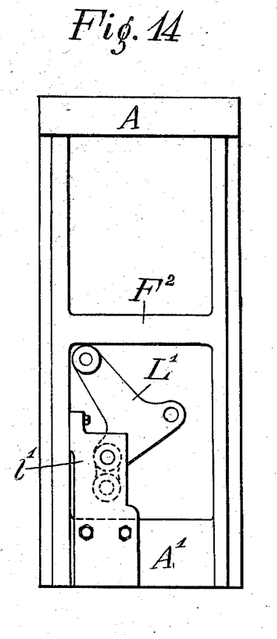
Figs. 14 and 15 are respectively similar views of a clamp and a knife-carrier.
Figure 15:
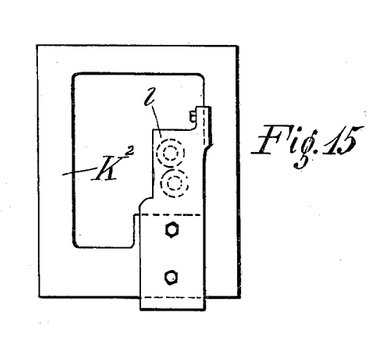
Figure 16:
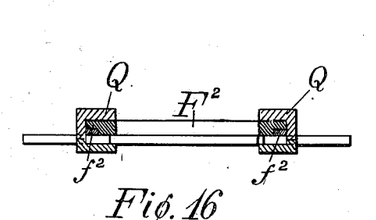
Fig. 16 is a horizontal sectional view of a plate-carrier Q and a clamp, showing also in full lines a knife-support.

In ways forming part of the frame F we mount on each side a plate-carrier Q, arranged to move laterally toward or from the central line of the machine, and in ways formed in said carriers we mount to reciprocate vertically the clamping-frames F' F² and the knife-carriers K' K², one of each on each side. The clamping-frames are provided with two sides extending up through openings in the table and cross pieces or bars A, connecting them and projecting inward beyond the line intended to be occupied by the book to be cut, and cross-bars A' at the bottom. The cross-bar A is a hollow trough or box provided with bearings for the journals of the cutting-blocks and a bar or plate provided with bolts $b$, by means of which the circular cutting-block B may be properly held in place, a portion of its face being exposed through a slot in the bottom of the box. When the clamps F' F² are placed in the ways in plate-carriers Q, retaining-strips $f'\ f^2$ (not shown) are then secured to such carriers Q, so as to hold the clamps in proper position, and the knife-carriers K' K² are then respectively set against the interior faces of the clamps, as shown in Fig. 12, their edges resting in the ways in carriers Q and between the interior faces of such ways and the interior faces of the uprights constituting part of the clamps. The clamp F³ and its knife-carrier and blade-support are reversely set—that is, with the cutting-block projecting outward and the knife-carrier on the outer face of the uprights of the clamp. The knife-carriers are provided with blade-supports mounted on steel rollers $r$, which run on ways on the carriers and have the knife-blades $k'\ k^2$ adjustably secured to their upper edges in such position that when the carriage is at the lowest limit of movement the upper edges of the knives will not project above the level of the table. These blade-supports are also provided with inclined slots, into which guide-pins $g$, extending from and secured to the main frame, project in order that when the knife-carriages are raised the knife-supports and their connected blades may be given a lateral as well as a vertical movement to secure a shearing cut.

Each set of devices, including a clamping-frame and knife-carrier, is provided with an actuator in the form of a rocking lever L', linked at one side of its center to the clamping-frame, at the other side to the knife-carrier, and connected at a third point, preferably a central one above a line connecting the first two points, to a pitman P'. These pitmen P' are connected to a cross-head H, journaled in the frame, and connected by pitman P³ to the crank C of the crank-shaft M. A guide-roller $g'$, secured to the lever L' and working between lugs, one on the clamping-frame and one on the knife-carrier, preserves the proper relations between those parts. At the end of the table there is a similar clamping-plate F³ and knife-carrier K³, supporting a knife $k^3$ and provided with rollers, guide-pins, lugs, links, and actuator, as are F' and K', its pitman P² being pivoted to the other pitman P', and thereby to pitman P³ and crank C; but as no lateral movement of these devices is required the plate F³ and knife-carrier K³ are mounted in grooves formed in or secured to the main frame instead of in a plate-carrier.

Above table T a return-chute V is mounted, and a book-lift T² is secured to cam-links J, which are held by pivot-pins I I', projecting from the frame. To these cam-links J connecting-rods N are pivoted, and these rods are pivoted to the upper ends of rocking levers L², secured to the rock-shaft R at the respective sides of the machine. A forked rod W is linked to the lever L², and its tines embrace the hub of cam C', while a pin $i$ extends from its face into the cam-groove $g^2$.

Figure 1:
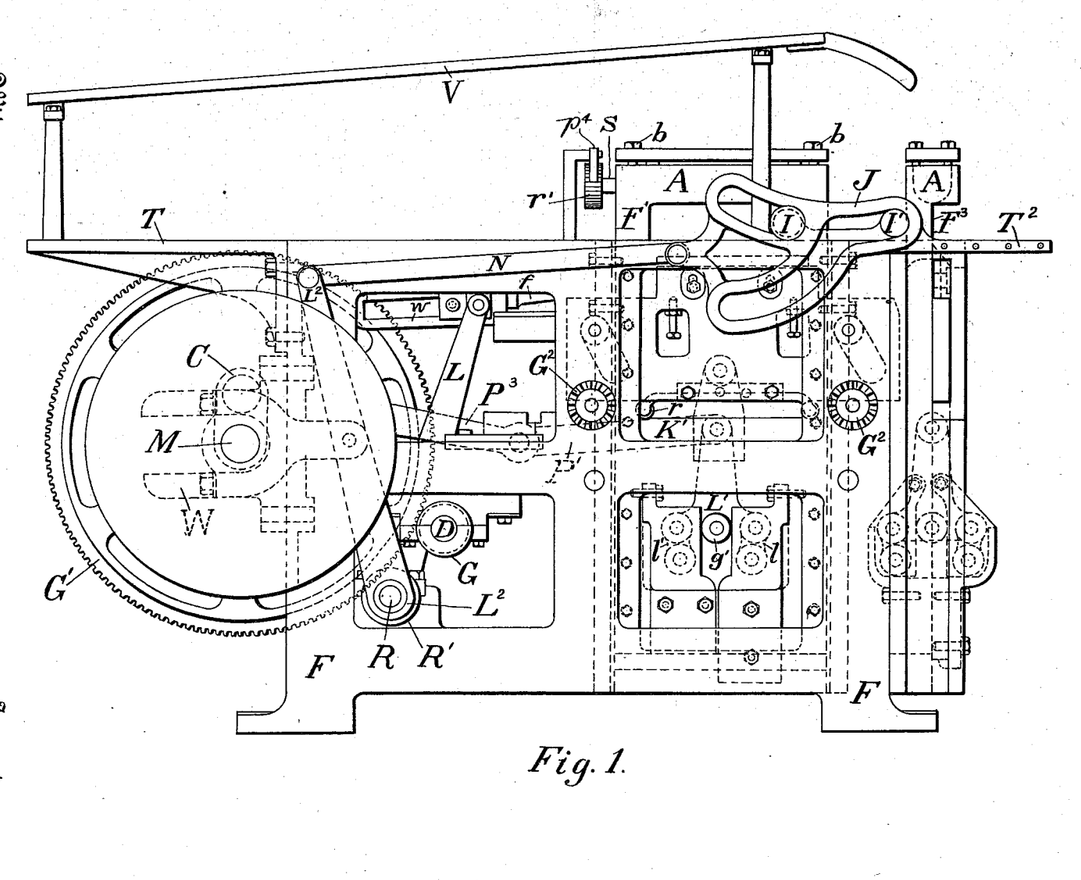
Figure 1 is a side elevation of a machine embodying our invention.
Figure 2:
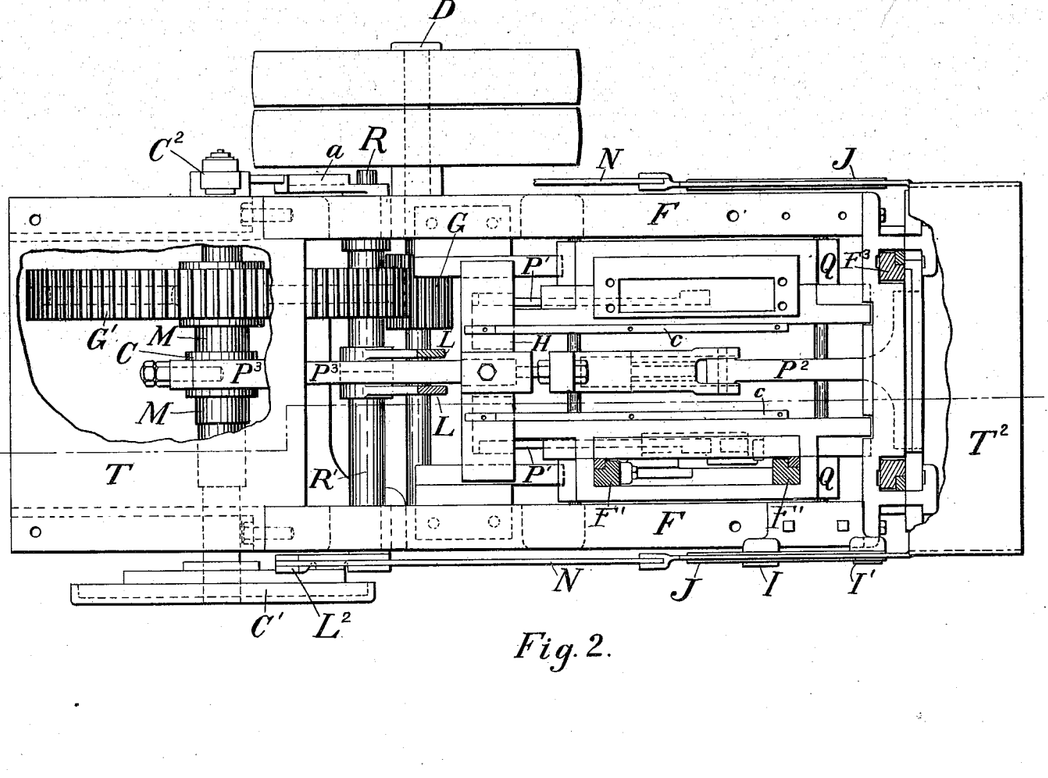
Fig. 2 is an upper or top plan view of said machine.
Figure 3:
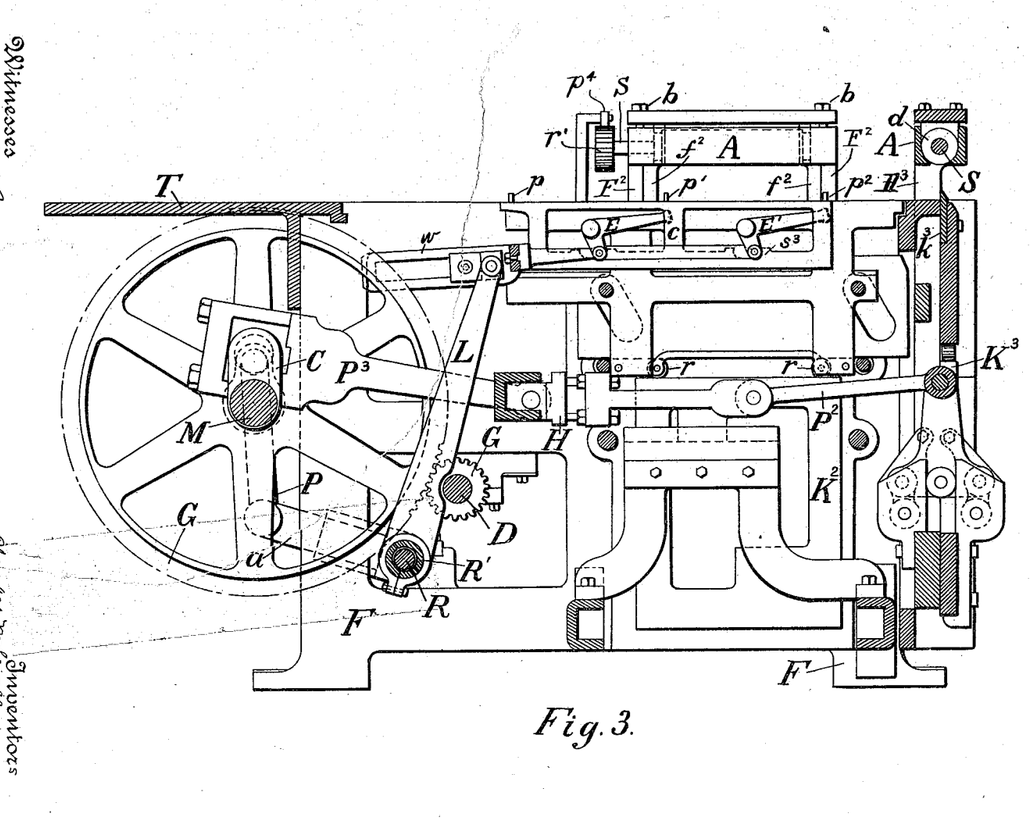
Fig. 3 is a sectional view on line 3 3 of Fig. 2.
Figure 4:
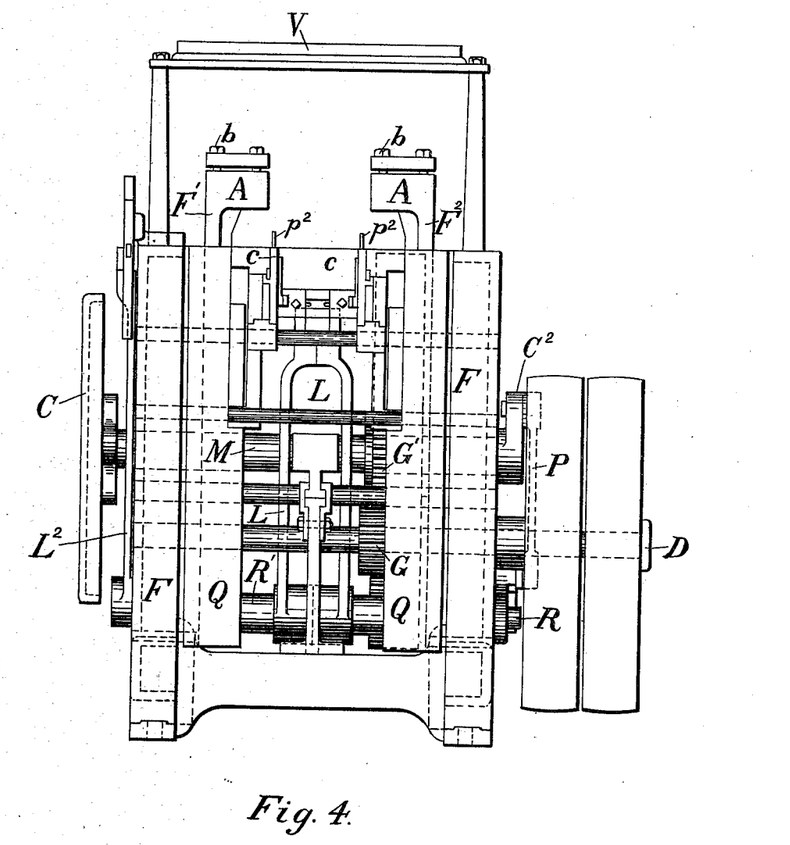
Figure 5:
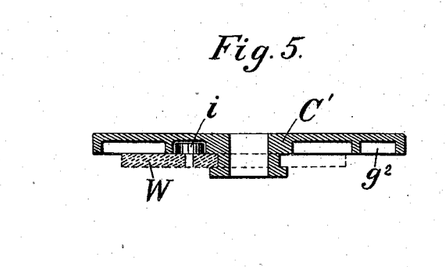
Fig. 5 is a horizontal sectional view of the cam C' employed to actuate the book-lift hereinafter described.
Figure 6:
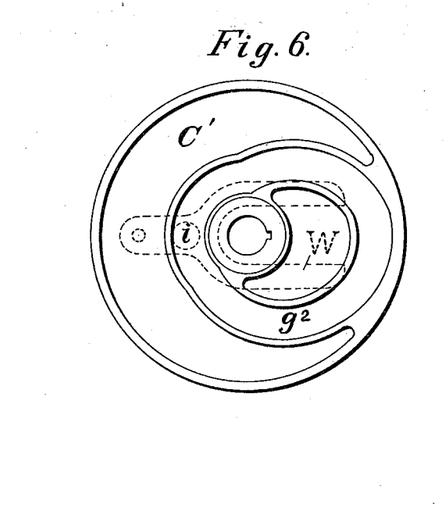
Fig. 6 is an interior face view of said cam.
Figure 7:
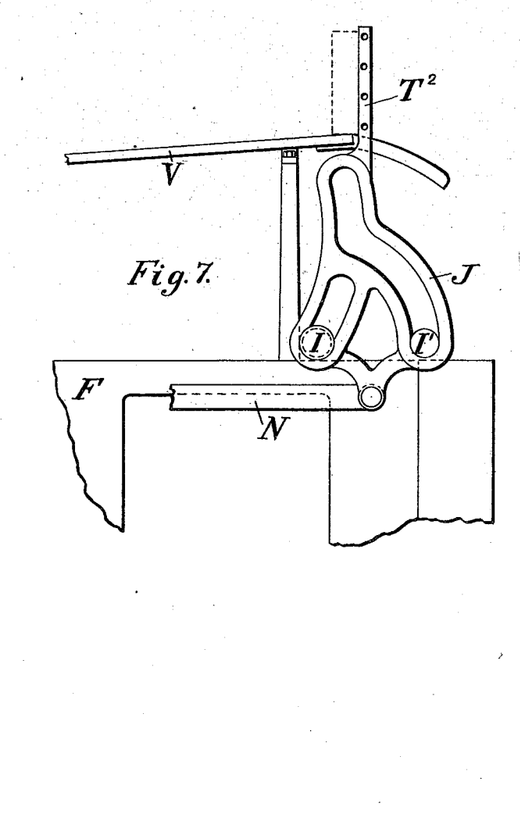
Fig. 7 is an end elevation of the book-lift and connected parts, showing also broken portions of the frame, chute, and connecting-rod.

When the feed-bars are retracted, the operator places a sufficient number of signatures, a book, say, three inches thick, or a series of books, pamphlets, or magazines making such a thickness, on the table T in front of pins $p$. Any other length of stack may be selected; but we have found this length the most convenient. Thereupon the shaft M turns, power being communicated by means of the pulleys on shaft D, and the pins $p$ will carry the signatures forward one step, as described. Then the pin-carriages $c$ will return, pins $p'$ and $p^2$, of course, passing under and in no way altering the position of the stack so advanced. Another stack is placed, and while pins $p$ carry this stack forward the first step pins $p'$, having been projected between stack one and two at the beginning of the forward movement, will carry the first stack forward the second step and to a position in line with the clamping-frames and knives $k'$ $k^2$, as is plainly shown from the position of the pins and frames in Fig. 3. Now crank C operates to draw the rod $P^3$, cross-head H, and pitmen $P'$ backward, and consequently rocks levers $L'$ to the left as viewed in Fig. 1. The knife-carriers are at their lowest limit of movement and cannot descend further. Consequently the pivot securing lever $L'$ to link $l'$ acts as a fulcrum, and the rocking of said levers forces down the clamping-frames $F'$, &c., until the clamping-faces of the cross-pieces A on frames $F'$ and $F^2$ bear firmly on the ends of the first stack. Then the frames can descend no farther, and as the stroke is only about one-half done the knife-carrier must rise, the pivot securing lever $L'$ to link $l$ of the clamping-frame in its turn acting as a fulcrum for this further movement, the rollers $g'$ meanwhile preserving the proper relative position of the levers $L'$. The knives, as stated, rise and with a shearing cut, as described, trim the ends of the stack. The operation continues, the knives fall, the clamping-frames rise, the pin-carrier is retracted, a new stack is placed before pins $p$, the levers L again swing forward, pins $p'$ $p^2$ rise in place, $p^2$ behind the partly-trimmed stack, $p'$ behind the second stack, and $p$ behind the third, the last-placed stack. The first stack is carried forward to where its side will be cut by the end knife, whose operation is just like that of the side knives, the second stack is carried forward to the next position and its end trimmed by the side knives at the same time that the end knife is trimming the side edges of stack one, and the third stack is likewise advanced one step. The next advance will carry the series of four stacks forward, the first (completely cut) to a point beyond the knives, the second to its side cut, the third to its end cut, and the fourth its first step. This first stack has now reached that part of the table which constitutes the book-lift $T^2$, and as the operation proceeds the movement of cam $C^2$ advances $L^2$, rocks shaft R, and consequently both levers $L^2$ swing forward, driving rods N, and thereby first pushing the cam-links J forward on their pivot-pins I I'. The lift being likewise carried on, further forward movement of the cam-link being impossible, the remainder of the stroke of the levers $L^2$, acting through rods N, swings this cam-link on its pivots I and I' and turns it and its connected lift $T^2$ to an upright position, as shown in Fig. 7, the stack being thereby carried up to and deposited upon the return-chute V, and there was thus completed the operations the machine is intended to accomplish, four being accomplished with each turn of the shaft—the advancing of one stack, the end trimming of another, the side trimming of the next, and the lifting and depositing in the return-chute of the one whose trimming was completed on the previous stroke.

In constructing our cutting-block we have devised one especially applicable to its intended use. As shown, it consists of a shaft or axle S, on which are strung a series of annular disks $d$, cut from a sheet of so-called "leather-board" and held in place by caps $c'$. The object is to present to the knife-edge a solid body of considerable durability which will not be quickly destroyed, because of the knife striking across the grain, and at the same time to have it in circular form that it may be turned slightly after every cut, and thus for a considerable period present an even surface. Leather could be used instead of leather-board, though it would be more expensive and less durable; but we do not limit ourselves to leather-board nor to leather, as a roller of sections of wood arranged so as to present fiber ends entirely around the roller would also to a great extent accomplish the desired end. As the face of the roller wears off the set-screws which hold its bearings may be turned down to bring it into proper position. A ratchet $r'$, secured to the shaft S, and a pawl $p^4$, extending from the frame, will produce the requisite partial rotation of this cutting-block at each reciprocation of its box.

One machine should be adapted to cut books of various widths and lengths, and to accomplish this it is of course necessary to provide for adjusting the side knives closer together and for the advance of the stack after its ends are cut by a shorter or longer step for a wider or narrower book, as the case may be, that being easier of accomplishment than an adjustment of the end knife, though that would be equally efficient in cutting the proper width, and it is for the purpose of adjusting the side knives, clamps, and cutting-blocks that they are mounted in the plate-carriers Q. Those carriers, as noted, are mounted to move laterally, and through them extend rods O, themselves provided with right and left handed threads, as shown in Fig. 10, and working in corresponding threads in the plate-carriers. These rods O are mounted in the main frame F and provided at the outer end with bevel-gears $G^2$, operated by other gears $G^3$, secured to a handle $h$, as shown. If the book to be cut be shorter than that for which the trimmer has been used, the handle is turned to the right, and the threaded rods O will force the plate-carriers closer together and hold them at the desired distance apart, the clamping-frames, cutting-blocks, knife-carriers, and knives being correspondingly drawn toward each other. Then by lengthening the feed-bars, which are provided with adjustable connection for that purpose, the machine is set to trim the smaller book as perfectly as though designed and constructed to trim it alone.

It will be noted that in our machine the clamping and trimming are really one operation. We do not, as has been heretofore done, first clamp the stack to a given stress and then cut the thus-clamped stack with no change in the clamp meanwhile, nor do we bring the pressure of the clamping-bar and the knife on the same side of the anvil. We bring the clamping-bar down to the stack and then with that for our fulcrum bring the knife upon the other side, like a pair of scissors with but one cutting edge, and as the pressure needed to cut is brought into play it is an added pressure on the clamping side as well as the cutting side, as it is the bearing of the clamp upon the stack that gives the base for applying the pressure to force the knife to its work, and the result is a much more evenly cut stack than would otherwise be produced, nor can there be any slipping, for the harder the pressure of the knife the harder the downdraft on the clamping-bar.

Again, it will be noticed that the peculiar arrangement of clamping-bar and knife-carrier results in the knife being always raised just sufficiently to cut such stack as may be placed in the clamp and no more. The upward movement of the clamping-bar is practically unlimited, and when the knife-carrier has reached its lower limit and the clamping-plate begins to rise it will be carried to a height equal to the full stroke of the machine. Now if nothing be placed in the clamp it can descend a full stroke when the lever L' is rocked backward and the knife-carriage will not be moved at all; but when a stack of books is placed in the clamp that will be stopped in its descent by said stack when the stroke is completed except by a distance equal to the thickness of the stack, and as it is at this time that the clamping-plate acts as a fulcrum by bearing on which the lever L' raises the knife-carrier and knife it will raise it by just the thickness of the stack and no more, as that is just the distance needed to complete the stroke. We therefore insure that the cutting stroke shall adjust itself to the thickness of the stack to be cut.

What we claim, and desire to secure by Letters Patent, is—

1. In a book-trimming machine, a feed device, composed of a reciprocating pin-carriage, provided with a series of pins at least one of which is mounted to reciprocate, a lever bearing upon the reciprocating pin, and means substantially as set forth for actuating said lever and carriage, all substantially as set forth.

2. In a book-trimming machine, a feed-carriage provided with reciprocating pins, elbow-levers bearing upon said pins, stops limiting the oscillatory movement of said levers and means for reciprocating said carriage and levers all substantially as set forth.

3. In a cutting-machine, a knife and a cutting-block mounted to rotate having its bearing-face composed of fiber ends, and set with its axis parallel to the edge of the knife, all combined substantially as set forth.

4. In a cutting-machine, a reciprocating knife and a cutting-block, mounted to rotate, and having its bearing-face composed of fiber ends, but set with its axis parallel to the edge of the knife, together with means substantially as described for rotating the block step by step, all substantially as set forth.

5. In a cutting-machine, a cylindrical cutting-block mounted to rotate and having its bearing-face composed of fiber ends, but set with its axis parallel to the edge of the knife, all substantially as set forth.

6. In a cutting-machine, a cutting-block mounted to rotate and composed of a central shaft carrying a series of annular disks of suitable material arranged as described, whereby the outer surface is composed of the fiber ends, but set with its axis parallel to the edge of the knife, all substantially as set forth.

7. In a cutting-machine, a clamping-piece provided with bearings for a rotary cutting-block and a slot in its clamping-face and a rotary cutting-block arranged as described whereby its face is exposed in said slot, all substantially as set forth.

8. In a cutting-machine the combination of a clamping-bar and a knife-carrier arranged to reciprocate, and located one on one side of the space to be occupied by the material to be cut and the other on the opposite side of said space, a rocking lever linked to each on opposite sides of its center and means for actuating said lever, whereby it will first move one of said elements in one direction and then move the other in the opposite direction, all substantially as set forth.

9. In a cutting-machine, the combination of a clamping-bar, carrying a clamp, and a knife-carrier, arranged to reciprocate, the clamp being located on one side of the space to be occupied by the material to be cut and the knife-carrier being located on the opposite side of said space, a rocking lever linked to each on opposite sides of its center, stops for limiting the movement of bar and knife-carrier in a given direction, and means for actuating said lever whereby it will first move one of said elements in one direction and then move the other in the opposite direction, all substantially as set forth.

10. In a book-trimming machine the combination of a clamping-bar and a knife-carrier arranged to reciprocate, the first being normally free to make a complete stroke, a rocking lever linked to each on opposite sides of its center and means for actuating said lever whereby it will move the clamping-bar in one direction and then move the knife-carrier in the opposite direction a distance equal to the complement of the stroke of the clamping-bar all substantially as set forth.

11. In a cutting-machine, a plate-carrier, mounted to move laterally and in turn supporting a clamping-bar and a knife-carrier, together with means for holding said plate-carrier in different lateral positions, all substantially as set forth.

Signed at New York, in the county of New York and State of New York, this 21st day of September, A. D. 1901.

CHARLES W. LOVELL.
DAVID WILLIAMSON.

Witnesses:
A. G. N. VERMILYA,
H. M. VERMILYA.